Figure 1:
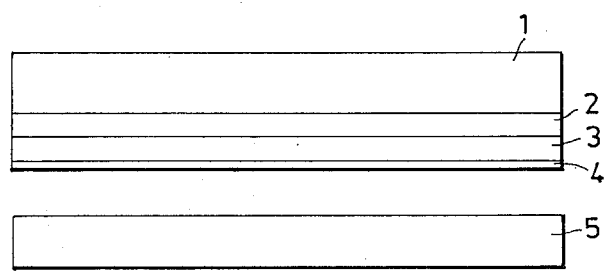

United States Patent [19]

Persson

[11] Patent Number: 4,867,369
[45] Date of Patent: Sep. 19, 1989

[54] METHOD PERTAINING TO THE EXPLOSION WELDING OF VERY THIN METAL LAYERS

[75] Inventor: Anne-Thérèse Persson, Nora, Sweden

[73] Assignee: Exploweld AB, Nora, Sweden

[21] Appl. No.: 116,080

[22] Filed: Nov. 4, 1987

[30] Foreign Application Priority Data

Nov. 7, 1986 [SE] Sweden ................... 8604770

[51] Int. Cl.⁴ ........................................... B23K 20/08
[52] U.S. Cl. ..................................... 228/107; 228/2.5
[58] Field of Search ................. 228/106, 107–109, 228/2.5

[56] References Cited

U.S. PATENT DOCUMENTS

| | | | |
|---|---|---|---|
| 3,364,562 | 1/1968 | Armstrong | 228/107 |
| 3,562,887 | 2/1971 | Schroeder et al. | 228/107 |
| 3,868,761 | 3/1975 | Apalikov et al. | 228/107 |
| 4,272,005 | 6/1981 | Jackson et al. | 228/107 |
| 4,641,775 | 2/1987 | Lande et al. | 228/2.5 |

FOREIGN PATENT DOCUMENTS

| | | | |
|---|---|---|---|
| 17849 | 10/1966 | Japan | 228/107 |
| 2657 | 1/1976 | Japan | 228/107 |

OTHER PUBLICATIONS

Pearson, Hayes, "Explosive Welding", Machine Design, pp. 170–178, Apr. 25, 1963.
Metals Handbook, Ninth Edition, vol. 6, pp. 705–710, copyright 1983.

*Primary Examiner*—Nicholas P. Godici
*Assistant Examiner*—Samuel M. Heinrich
*Attorney, Agent, or Firm*—Nies, Webner, Kurz & Bergert

[57] ABSTRACT

A method of explosion welding very thin plastic foil to a thicker base material. By fastening a soft material of low acoustic velocity in position on the metal foil prior to carrying out a welding operation, the pressure differences which prevail in the pressure wave incident on the metal foil are equalized in a manner to maintain a uniform pressure wave during the welding sequence. The inventive method enables the explosion welding of thin metal layers having a thickness as low as some few microns.

8 Claims, 1 Drawing Sheet

METHOD PERTAINING TO THE EXPLOSION WELDING OF VERY THIN METAL LAYERS

Explosion welding is a known technique carried out by various manufacturers in the production of their products.

It is also known to explosion weld thin metal foil, having a thickness of some tenths of a millimeter, to a thicker base material by using a technique in which the foil is initially secured in position on a thicker carrier plate, e.g. a plate or substrate structure made of building board or iron, by being glued thereto.

Surface irregularities in the carrier plate and irregularities in detonation of the explosive, however, often result in faults in the form of holes and improperly welded areas of the foil, therewith often making it necessary to carry out subsequent rectification work, which is both time consuming and expensive and which lowers the quality of the resultant welded composite.

Experiments has shown that substrates cannot be coated or plated successively with extremely thin coatings (coatings of some few microns) by means of this known method.

The object of the present invention is to provide an improved method which will enable foils having thicknesses as small as 8 microns to be explosion welded to substrate or carrier surfaces successfully, in the absence of holes or badly welded foil sections.

DESCRIPTION

In accordance with the invention metal foil is placed on a substrate consisting of a soft material of low acoustic velocity, e.g. a rubber substrate, which in turn is placed on a more rigid carrier plate, e.g. a plate made of metal, building board, plasterboard, rigid plastic or plexiglass.

Due to the low acoustic velocity of the soft substrate plate located nearest the metal foil, small irregularities in the pressure wave induced by the explosion, or irregularities in the surface structure of the rigid carrier plate, are able to equalize before the pressure wave reaches the metal foil.

Consequently, no velocity differentials which are likely to cause holes or faults in the weld or fusion between the foil and the carrier plate can occur along the surface of the metal foil.

FIG. 1 illustrates the method according to the invention, in which the reference (1) designates the explosive charge; (2) designates the rigid carrier plate; (3) designates the soft substrate plate; (4) designates the metal foil; and (5) designates the base material.

A high degree of accuracy must be observed when fastening together the various layers of the composite, i.e. the metal foil, the soft substrate plate and the rigid carrier plate.

When an adhesive substance is used to this end it is preferred to use a spray-on adhesive or an adhesive foil, therewith to avoid the occurrence of glue bubbles and glue agglomerations.

The soft substrate plate and the rigid carrier plate may also be molded directly on the metal foil. In this case the soft substrate plate is preferably made of silicon rubber and the rigid plate of, e.g., araldite.

I claim:

1. A method of explosion welding a thin metal foil layer to a thicker base material, said foil layer having a thickness in the range from 8 microns to 1000 microns, the improvement comprising the steps of fastening the metal foil layer to one side of a substrate plate of soft elastic material having a low acoustic velocity characteristic, said value of acoustic velocity being lower than 1500 m/s; fastening to the other side of said soft substrate plate a rigid carrier plate; placing an explosive substance on the surface of the carrier plate distal from the soft substrate plate; maintaining said base material, said metal foil layer, said plates and said explosive substance in mutually parallel relationship with said metal foil layer placed closely adjacent the surface of the thicker base material prior to detonation; and then detonating said explosive substance, whereby the pressure differences which prevail in the resultant pressure wave incident on the metal foil are equalized in a manner to maintain a uniform pressure wave during the sequence of welding the metal foil layer to the thicker base material.

2. A method according to claim 1, characterized in that the soft substrate plate is made from a soft plastics material.

3. A method according to claim 1, characterized in that the soft substrate plate is made from rubber.

4. A method according to claim 1, characterized in that the rigid carrier plate is made of metal.

5. A method according to claim 1, characterized in that the rigid carrier plate is made of an organic material, such as plastics, plexiglass or woodfibre.

6. A method according to claim 1, characterized by the step of fastening the metal foil, the soft substrate plate and the rigid carrier plate to one another with the aid of an adhesive.

7. A method according to claim 1, characterized by the step of molding the soft substrate plate directly onto the metal foil.

8. A method according to claim 1, characterized by the step of molding the rigid carrier plate onto the soft substrate plate.

* * * * *

UNITED STATES PATENT AND TRADEMARK OFFICE
CERTIFICATE OF CORRECTION

PATENT NO. : 4,867,369
DATED : September 19, 1989
INVENTOR(S) : Anne-Therese Persson It is certified that error appears in the above-identified patent and that said Letters Patent is hereby corrected as shown below:

On the title page, under "FOREIGN PATENT DOCUMENTS" insert

--760427  6/1967  CANADA--.

Signed and Sealed this

Fourth Day of September, 1990

Attest:

HARRY F. MANBECK, JR.

*Attesting Officer*   Commissioner of Patents and Trademarks